United States Patent [19]

Friedli et al.

[11] 4,336,349

[45] Jun. 22, 1982

[54] CHLORINATED CYCLOALIPHATIC (METH) ACRYLATE COMPOSITIONS

[75] Inventors: Hans R. Friedli, Lake Jackson; Clinton J. Boriack, Freeport both of Tex.

[73] Assignee: The Dow Chemical Company, Midland, Mich.

[21] Appl. No.: 219,071

[22] Filed: Dec. 22, 1980

Related U.S. Application Data

[63] Continuation-in-part of Ser. No. 62,198, Jul. 30, 1979, abandoned.

[51] Int. Cl.$^3$ ...................... C07C 67/04; C08F 18/20; C08F 299/00
[52] U.S. Cl. .................................. 525/210; 428/442; 428/450; 525/31; 525/39; 525/44; 525/107; 525/112; 525/290; 526/283; 560/220
[58] Field of Search ................ 525/210, 290; 526/283; 560/220

[56] References Cited

U.S. PATENT DOCUMENTS

2,414,089  1/1947  Bruson ................................ 560/107
3,143,535  8/1964  Jackson et al. ...................... 560/220

*Primary Examiner*—Stanford M. Levin
*Attorney, Agent, or Firm*—B. G. Colley

[57] ABSTRACT

Chlorinated cycloaliphatic (meth) acrylate compositions are prepared by the reaction of chlorine at a temperature in the range from $-30°$ C. to $50°$ C. with compositions made by reacting (meth) acrylic acid with crude dicyclopentadiene in the presence of a Friedel-Crafts catalyst such as $BF_3$. The chlorinated compositions have a pleasant fruity odor and are useful to make homopolymers or copolymers which find use as metal coatings, inks, ultraviolet light curable coatings and the like.

6 Claims, No Drawings

CHLORINATED CYCLOALIPHATIC (METH) ACRYLATE COMPOSITIONS

CROSS REFERENCE TO RELATED APPLICATIONS

This application is a continuation-in-part of Ser. No. 62,198, filed July 30, 1979, now abandoned.

BACKGROUND OF THE INVENTION

This invention relates to chlorinated cycloaliphatic (meth) acrylate compositions which are the complex reaction products of chlorine with cycloaliphatic (meth) acrylate compositions.

It is known from Ser. No. 951,416 filed Oct. 13, 1978 that cycloaliphatic (meth) acrylate compositions can be produced by reacting a crude dicyclopentadiene with acrylic acid or methacylic acid in the presence of a Friedel-Crafts catalyst such as $BF_3$. These compounds have the sharp, penetrating "acrylate" odor.

Pure dicyclopentadiene acrylate (DCPDA) is known from U.S. Pat. No. 2,414,089 dated Jan. 14, 1947.

The preparation of 2, 3-dibromo DCPDA is known from U.S. Pat. No. 3,143,535 dated Aug. 4, 1964. The dibromo compound is very dense and viscous, and is produced by the esterification of 2,3-dibromo DCPD alcohol with acrylic acid.

SUMMARY OF THE INVENTION

The chlorinated cycloaliphatic (meth) acrylate compositions of this invention comprise, (A) about 60 to 95 percent by weight of dicyclopentadiene acrylate, dicyclopentadiene methacrylate, or mixtures thereof, (B) about 2 to 15 percent by weight of a mixture of polycyclopentadienyl acrylates of the formula

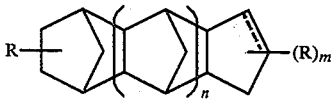

where

R is $CH_2=CZC(O)-O-$
Z is H, or methyl
n is 1, or 2
m is 0 or 1 and when m is 0 there is a double bond present, (C) about 0 to about 21 percent by weight of a mixture of the copolymers of methacrylic acid or acrylic acid with adducts of cyclopentadiene with isoprene, piperylene, methylcyclopentadiene, or mixtures thereof, (D) about 0.05 to 10 weight percent of a mixture of polyacrylates having the repeating unit:

$$-CH_2-CZ-$$
$$|$$
$$C=O$$
$$|$$
$$OR'$$

where R' is hydrogen or

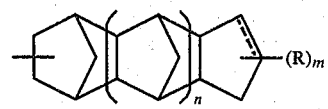

R is $CH_2=CZ-C(O)-O-$, Z is hydrogen or methyl, n is 0, 1 or 2, and m is 0 or 1, and when m is 0, there is a double bond present in the cyclopentadienyl group, whereby said reaction product has substantially all the original acrylic unsaturation, substantially no remaining cycloolefinic unsaturation and has 1 to 3 chlorine atoms attached to the original cyclopentene ring.

These compositions are prepared by chlorinating cycloaliphatic (meth) acrylate compositions with chlorine gas at a temperature in the range from $-30°$ to $50°$ C. in the presence of an inert solvent.

The compositions of this invention are useful as monomers or comonomers in thermosetting resins or thermoplastics. They are also useful to form metal coatings with good adhesion, laminates and inks since they are curable by ultraviolet light. The instant compositions have a pleasant fruity odor and their polymeric products are odor-free.

DESCRIPTION OF THE PREFERRED EMBODIMENTS

The main reactants to make the compositions of this invention are the products set forth in the aforementioned Ser. No. 951,416 which are referred to hereinafter as cycloaliphatic acrylate compositions or CAC and CMC for cycloaliphatic methacrylate compositions.

These CAC or CMC compositions are chlorinated with chlorine gas at temperatures in the range from about $-30°$ to about $50°$ C. and preferably in the range $-20°$ to $20°$ C. in the presence of an inert solvent.

Useful solvents are those that are not attacked by chlorine under the reaction conditions and are easily removed. Examples are halogenated solvents, such as methylene chloride, carbon tetrachloride, chloroform, methylchloroform, fluorocarbons, such as Freons ®, e.g., Freon 11, 12, 21, 114, and benzene.

If desired, the use of a solvent can be eliminated. However, the reaction is more difficult to carry out because of poor mixing and heat removal, and the temperature must be raised to the range $0°-20°$ C. in order to reduce the viscosity.

After chlorination, the reaction products are washed with water several times. The solvents are removed by vacuum distillation and the polymerization of the product during the distillation step is prevented or inhibited by the use of a small amount of a polymerization inhibitor such as tertiary butyl catechol, hydroquinone, or phenothiazine. Generally, about 50–300 parts per million of the polymerization inhibitor will be used.

The chlorinated compositions prepared herein are useful to make polymers alone or in combination with unsaturated monomers or unsaturated resins.

Examples of unsaturated monomers which are polymerizable with the present compositions are one or more acrylates and vinyl aromatics such as styrene, alpha methyl styrene, halo styrenes, vinyltoluene, divinyl benzene, and the like, allyl compounds such as diallyl phthalate or allyl alcohol, olefins such as butene, diolefins such as butadiene, halogenated olefins such as vinyl chloride, and vinyl cyanide.

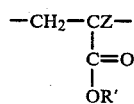

Examples of unsaturated resins which are polymerizable with the present compositions are one or more unsaturated polyester resins, vinylester resins as described in U.S. Pat. Nos. 3,367,992, 3,564,074 and 3,594,247, polybutadiene and polyisoprene, styrene/butadiene copolymers and the like.

Polymerization is accomplished by a free radical mechanism i.e. using free radical catalysts such as benzoyl peroxide, including initiation by electron and ultraviolet irradiation.

If desired, the above thermosetting resins can be blended with an ethylenically unsaturated monomer mixture copolymerizable with the unsaturated polymers. The mixture comprises vinyl aromatic monomers such as styrene, alpha-methyl styrene, chlorostyrene, vinyl toluene, divinyl benzene, and diallyl phthalate with about 5 to about 90 weight percent of the chlorinated compositions of this invention.

The thermosetting blends with the unsaturated monomer mixture should contain 20 to about 70 percent by weight and preferably 30 to 50 percent by weight of the monomer mixture based on the weight of the resin. A small amount of inhibitor such as tertiary butyl catechol, hydroquinone, or the like is added to this mixture. The amount added is generally in the range from about 50–300 parts per million based on the amount of unsaturated monomer.

The final blend is a crosslinkable resin composition which is useful to make laminates.

Laminates are made by mixing into the crosslinkable composition free radical forming catalysts and adding this mixture to a suitable fibrous substrate such as asbestos fibers, carbon fibers, fibrous glass, or inorganic fibers. Examples of these catalysts are benzoyl peroxide, tertial butyl peroxide, methylethylketone peroxide and the like. It is also of value to add accelerators such as cobalt naphthenate, dimethyl aniline, and the like.

The crosslinkable composition is rolled, sprayed or impregnated into the fibrous reinforcement such as fibrous glass and cured in a manner well known in the art. When fibrous glass is used, it can be in any form such as chopped strands, filaments, glass ribbons, glass yarns, or reinforcing mats.

The following examples and preparations are presented to illustrate but not to limit the invention.

Preparation 1

Glacial acrylic acid (AA) containing 0.1% methylether of hydroquinone (MEHQ) inhibitor and borontrifluoride etherate catalyst were premixed in a stainless steel feed tank and pumped with a metering pump to a mixing tee where they were combined with a metered stream of dicyclopentadiene (96% pure DCPD) inhibited with tertiary butyl catechol. This feed mixture was preheated and converted in a jacketed $\frac{3}{8}$" O.D.×0.035" walls×35" length reactor tube made of stainless steel. The reaction temperature was maintained by controlling the jacket temperature. The reaction pressure was controlled at 30–60 psig to maintain liquid phase. Steady state conditions were reached in 15–30 minutes. The effluent from the flow reactor was fed via a letdown valve to a falling film stripper column of $\frac{1}{2}$" O.D.×0.035" wall×46" length. The feed was distributed to the stripper wall via a slotted weir. The stripper temperature was controlled with a steam heated jacket and the pressure was reduced with a vacuum pump outfitted with a pressure regulator. In the stripper, predominantly acrylic acid/BF$_3$ complex and acrylic acid are removed overhead through a rectification/demister section and recycled to the reactor. Overheads and bottoms were cooled and collected for mass balance and analysis.

The reactor was fed at a rate of 3.24 ml/min. with a glacial acrylic acid/BF$_3$ etherate mixture (2.53% BF$_3$ etherate) and with 3.19 ml/min. DCPD. This corresponds to a 2/1 molar ratio of acrylic acid to DCPD and 0.6% BF$_3$ based on total feed. Temperatures in the reactor and stripper were 120° C. The pressure in the stripper was 5 mm Hg. The residence time in the reactor was eight minutes, and about two minutes in the stripper.

During a 4.5 hour period of continuous run, the following quantities were fed and recovered:

| Feed | | Product | |
|---|---|---|---|
| AA + BF$_3$ Et$_2$O | 903.70g | Bottom Product | 1248.98g (72.7%) |
| DCDP | 823.80g | Overhead Product | 469.81g (27.3%) |
| Total | 1727.50g | Total | 1718.79g |

706.4 of the stripper bottoms were placed in a one gallon glass bottle, stirred and heated to 70° C. 689.6 g of 70° C. deionized water were added and the mixture was stirred for five minutes. Excellent phase separations were obtained with separation times of 3 to 3.5 minutes. The washing was repeated three times and 689 g of wet dicyclopentadiene acrylate concentrate were obtained. This material was dried in a two liter flask equipped with a magnetic stirring bar at room temperature at 12 mm Hg. Loss was 13.65 g or 1.98% giving 675.35 g of a bright clear liquid with the following properties:

| | |
|---|---|
| Gardner color | 6–7 |
| Viscosity | 22 cps (24° C.) |
| Boron | 2 ppm |
| Dicyclopentadiene acrylate (DCPDA) | 83.6% |
| Polycyclopentadientyl acrylates | 12.6% |
| Copolymers of acrylic acid | 1.0% |
| Polyacrylates | 2.8% |

Similar results are obtained when the acrylic acid is replaced with methacrylic acid.

Preparation 2

Using the identical procedure and conditions, but using a DCPD concentrate as feedstock the following results were obtained:

| | |
|---|---|
| Converisons | 99.7% (based on DCPD) |
| Gardner color | 9–10 |
| Viscosity | 63.9 cps (24° C.) |
| Dicyclopentadiene acrylate (DCPDA) | 72.7% |
| Polycyclopentadienyl acrylates | 10.2% |
| Copolymers of acrylic acid | 14.0% |
| Polyacrylates | 3.0% |

The above dicyclopentadiene concentrate contained 84% DCPD, 13% dimers of cyclopentadiene with isoprene, piperylene, etc., and 2% tricyclopentadiene and tetracyclopentadiene.

Preparation 3

237.6 pounds of dicyclopentadiene (97% pure DCPD) were inhibited with 238 g of methylether of hydroquinone (MEHQ) dissolved in 900 g acrylic acid. 194.4 pounds of glacial acrylic acid containing 0.1% MEHQ inhibitor were loaded into a stirred 100-gallon stainless steel reactor and mixed with 2476 g of $BF_3$ etherate. The empty space in the reactor was filled with 2% $O_2$ in nitrogen at 2-5 psig. All exposed metal surfaces were kept wetted with inhibited reaction mixture or by an internal spray system. 11.0 pounds of the inhibited DCPD were added to the kettle and the temperature increased to 40° C. After analysis showed that the reaction had started, the DCPD was added at a rate of about 25 pounds/hour (9.6 hrs) at 50°-60° C. After all DCPD was added, the reaction was completed at 70° C. in 3.2 hours. Unreacted acrylic acid, catalyst, and color bodies were removed by five washes with 50-65 gallons of water at 70° C. The washed material was dried for three hours until the kettle conditions were 69° C. and 33 mm Hg. The product was cooled, drummed, and the MEHQ concentration adjusted to 190 ppm. 363 pounds of cycloaliphatic composition were obtained. The yield on DCPD is 98.8%. The product has the following characteristics:

| | |
|---|---|
| Gardner color | 3-4 |
| Viscosity | 16.7 cps (at 24° C.) |
| Boron | 5.6 ppm |
| Dicyclopentadiene acrylate (DCPDA) | 87.7% |
| Polycyclopentadienyl acrylate | 11.2% |
| Copolymers of acrylic acid | 0.9% |
| Polyacrylates | 0.2% |

EXAMPLE 1

In a 3-necked 2,000 ml round bottom flask 377.3 g (1.801 moles) of a cycloaliphatic acrylate composition (CAC) prepared by a method similar to Preparation 3 above and 1200 ml methylene chloride (1:3.4 volume ratio) were mixed and cooled to $-10°$ C. The flask was equipped with a mechanical stirrer, a thermometer, a chlorine inlet, a vent, and a bath capable of maintaining the reaction temperature at $-10°$ to $-20°$ C. during chlorine addition. The diluted CAC's were chlorinated with 140.5 g (1.98 moles) of chlorine over a period of 75 minutes while agitating the solution vigorously. The work-up consisted of 3 washes with distilled water, followed by solvent recovery under vacuum. Before solvent removal, 200 ppm of t-butyl catechol (TBC) based on monomer were added.

The composition of the resultant product is listed in Table 1. The products were identified by gas chromatography and mass spectroscopy and the principal components are the dichlorides of di- tri- and tetracyclopentadiene acrylate formed by the chlorination of the cyclopentene bond. The finished product has about the same amber color as the starting material, but the odor level is reduced and the odor quality is pleasantly fruitlike.

EXAMPLE 2

Following the procedure outlined in Example 1, the same CAC was chlorinated with less solvent dilution.

200.0 g of CAC (0.954 moles) were mixed with 300 ml of carbon tetrachloride (1:1.6 volume ratio) and reacted with 63.1 g (0.89 moles) of chlorine at $-20°$ C. Upon purification as in EXample 1 a slightly more viscous material of a composition listed in Table 1 was obtained. The color and odor characteristics were as in Example 1.

TABLE 1

| Chlorination of CAC's in Solvents | | |
|---|---|---|
| Example | 1 | 2 |
| Solvent Ratio/Solvent | 1:3.4$CH_2Cl_2$ | 1:1.6 $CCl_4$ |
| DCPDA Conversion | ~100% | ~100% |
| Reaction condition | $-10°$ C. | $-20°$ C. |
| DCPDA (dicyclopentadienyl acrylate) | .8 | .2 |
| $Cl_1$DCPDA | 1.2 | 1.6 |
| $Cl_2$DCPDA | 78.6 | 77.0 |
| ($Cl_{3-4}$DCPDA and $Cl_{1-4}$DCPDA-H)* | 13.5 | 20.0 |
| Unidentified | 5.9 | 1.2 |

*Includes chlorination products of heavy acrylates and $Cl_{3-4}$ products of DCPDA.

EXAMPLE 3

Following the procedure of Example 1, 50 g (0.20 moles) of a cycloaliphatic composition (CAC) was chlorinated at $-20°$ C. in 300 milliliters methylene chloride. (1:6 volume ratio) using 20.0 g gaseous chlorine (0.28 moles). The composition of the CAC used was 79.9% DCPDA, 11.1% polycyclopentadienyl acrylates (DCPDA-H) and about 9% of oligomers of acrylic acid with codimers of cyclopentadiene with isoprene, piperylene and methylcyclopentadiene, and small amounts of acrylate polymers. Work-up and product stabilization was as described in Example 1.

The product had a density of 1.29 g/$cm^3$ at 25° C. and a Gardner color of 8-9. Its odor was faint and pleasant.

EXAMPLE 4

Following the general procedure of Example 1, 53.3 g (0.240 moles) of a cycloaliphatic product consisting of 93.0% dicyclopentadiene methacrylate (DCPDM), 7% of mostly tri and tetra-cyclopentadiene methacrylate and dicyclopentadiene (DCPD) dimethacrylate and 0.1-0.3% acrylate polymer were diluted to a 1:6.0 volume ratio with methylene chloride (300 ml). Chlorine gas (17.5 g, 0.25 moles) was added at $-20°$ C. over a period of 53 minutes. The products were recovered as in Example 1.

EXAMPLE 5

In a manner similar to Example 4, 107.3 g (0.483 moles) of the same product were dissolved in 150 ml methylene chloride (volume ratio 2:3) and chlorinated at $-20°$ C. with 38.0 g (0.536 moles, of chlorine over a period of 111 minutes. The products were recovered as in Example 1.

The final products from Examples 4 and 5 had gas chromatographic pattern very similar to the corresponding acrylate materials. The product consisted predominantly of the dichloride formed by the addition of chlorine to the cyclopentene double bond with the exclusion of the acrylate bond. As with the CAC products, the selectivity to dichloride was higher at the higher dilution level and the odor decreased and the odor quality improved upon chlorination. The compositions for the examples are listed in Table 4.

TABLE 2

| Chlorination of CMC at two dilution levels. | | |
|---|---|---|
| Example | 4 | 5 |
| Solvent ratio/Solvent | 1:6/$CH_2Cl_2$ | 2:3/$CH_2Cl_2$ |
| Conversion of CMC | ~100% | ~100% |
| Reaction conditions | $-20°$ C. | $-20°$ C. |

TABLE 2-continued

Chlorination of CMC at two dilution levels.

| Example | 4 | 5 |
|---|---|---|
| DCPDM (dicyclopentadienyl methacrylate) | .2 | .2 |
| Cl₁DCPDM | 3.7 | 5.5 |
| Cl₂DCPDM | 83.0 | 76.5 |
| (Cl₃₋₄DCPDM and Cl₁₋₄DCPDM-H)* | 13.0 | 16.0 |
| Unidentified | .1 | 1.8 |

*Includes chlorination products of heavy methacrylates and Cl₃₋₄ products of DCPDM.

EXAMPLE 6

Chlorinated CAC (Example 1) homopolymerized rapidly by free radical and photo initiation.

For this composition, ultraviolet photo initiation and rapid cure was obtained when thin films (0.2–0.3 mls) on steel (bonderite 37) or aluminum panels were passed under a 200 watts U.V. lamp at 100 foot/minute line speed. 3-4 passes were required to obtain odor-and mar-free coatings with excellent adhesion. Two suitable initiator systems are 3.0% benzoin butyl ether or a combination of 3.0% diethoxyacetophenone and 2.0% methyl diethanolamine.

EXAMPLE 7

Chlorinated CAC (Example 1) was mixed with commercial vinyl ester resins in a 1:1 weight ratio. The vinyl ester resin was The Dow Chemical Company's vinyl ester resin XD 9002. Rapid polymerization to copolymers occurred during 3-4 passes under a 200 watt/linear inch mercury arc lamp at 100 foot/minute line speed using 3% diethoxyacetophenone and 2% diethanolamine as the photo initiator system. The resultant coating was odor-free and had good solvent and mar resistance and excellent adhesion.

EXAMPLE 8

In a two liter flask, 320 g of butyl acrylate (50%), 12.8 g acylic acid (2%), 245.2 g (38%) methyl methacrylate, and 62 g (10%) of chlorinated product of Example 3 were copolymerized into a latex containing about 40% solids by an emulsion technique using sodium persulfate as the initiator. The solids contained about 10% by weight of the chlorinated DCPDA.

A control latex was also made using 307.2 g (48%) of the methyl methacrylate and no chlorinated DCPDA.

Films were prepared from the above latexes after thickening with Acrysol RM-4 a commercial latex of Rohm and Hass by casting the latexes on glass plates and curing.

Coated panels were also prepared by coating the latexes on clean cold rolled steel panels and aluminum panels.

When these sample films and coated panels were tested it was found that the latex containing the chlorinated DCPDA was equal to or better than the control in tensile, elongation, adhesion, solvent resistance, impact, and abrasion tests.

We claim:

1. A chlorinated cycloaliphatic (meth) acrylate composition which comprises the reaction product at a temperature in the range from −30° to 50° C. of chlorine with a cycloaliphatic (meth) acrylate composition having
   (A) about 60 to 95 percent by weight of dicyclopentadiene acrylate, dicyclopentadiene methacrylate, or mixtures thereof,
   (B) about 2 to 15 percent by weight of a mixture of polycyclopentadienyl acrylates of the formula

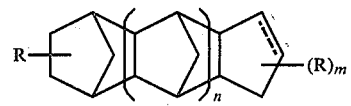

where
R is CH₂=CZC(O)—O—
Z is H, or methyl p2 n is 1, or 2
m is 0 or 1 and when m is 0 there is a double bond present,
   (C) about 0 to about 21 percent by weight of a mixture of the copolymers of methacrylic acid or acrylic acid with adducts of cyclopentadiene with isoprene, piperylene, methylcyclopentadiene, or mixtures thereof,
   (D) about 0.05 to 10 weight percent of a mixture of polyacrylates having the repeating unit:

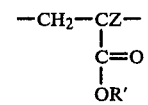

where R' is hydrogen or

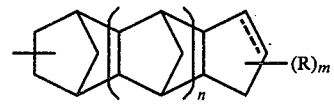

R is CH₂=CZ—C(O)—O—, Z is hydrogen or methyl, n is 0, 1 or 2, and m is 0 or 1, and when m is 0, there is a double bond present in the cyclopentadienyl group, whereby said reaction product has substantially all the original acrylic unsaturation, substantially no remaining cycloolefinic unsaturation and has 1 to 3 chlorine atoms attached to the cyclopentene ring.

2. The composition of claim 1 wherein the reaction takes place in the presene of an inert solvent.

3. The composition of claim 2 wherein the reaction takes place in the presence of an halogenated solvent.

4. A polymer of the composition of claim 1.

5. A copolymer which comprises
   (A) the composition of claim 1, and
   (B) one or more unsaturated monomers.

6. A copolymer which comprises
   (A) the composition of claim 1, and
   (B) one or more unsaturated monomer selected from the acrylates, vinyl aromatics, allyl compounds, olefins, diolefins, and halogenated olefins.

* * * * *